(12) United States Patent
Doherty et al.

(10) Patent No.: US 7,742,435 B1
(45) Date of Patent: Jun. 22, 2010

(54) PROVIDING A LOW LATENCY BACKBONE IN A WIRELESS MESH NETWORK

(75) Inventors: Lance R. Doherty, Oakland, CA (US); Jonathan Simon, Castro Valley, CA (US); William Alan Lindsay, El Cerrito, CA (US)

(73) Assignee: Dust Networks, Inc., Hayward, CA (US)

( * ) Notice: Subject to any disclaimer, the term of this patent is extended or adjusted under 35 U.S.C. 154(b) by 299 days.

(21) Appl. No.: 11/881,822

(22) Filed: Jul. 27, 2007

(51) Int. Cl.
*H04L 12/28* (2006.01)
*H04L 12/56* (2006.01)

(52) U.S. Cl. .................. 370/254; 370/338; 370/389

(58) Field of Classification Search .................. None
See application file for complete search history.

(56) References Cited

U.S. PATENT DOCUMENTS

| | | | |
|---|---|---|---|
| 6,914,893 B2 * | 7/2005 | Petite .......................... | 370/338 |
| 7,002,938 B2 * | 2/2006 | Hester et al. ................. | 370/330 |
| 2007/0019604 A1 * | 1/2007 | Hur et al. ..................... | 370/347 |
| 2007/0147268 A1 * | 6/2007 | Kelley et al. ................. | 370/254 |
| 2007/0253345 A1 * | 11/2007 | Habetha et al. ............. | 370/254 |
| 2007/0258508 A1 * | 11/2007 | Werb et al. .................. | 375/140 |
| 2008/0253327 A1 * | 10/2008 | Kohvakka et al. ........... | 370/330 |

* cited by examiner

*Primary Examiner*—Hong Cho
*Assistant Examiner*—Robert C Scheibel
(74) *Attorney, Agent, or Firm*—Van Pelt, Yi & James LLP

(57) ABSTRACT

Communicating for a mesh network is disclosed. A battery-powered node is assigned to communicate with a sending powered backbone node. The sending powered backbone node is assigned to either a first group or a second group. If the sending powered backbone node is assigned to the first group, then the sending powered backbone node sends a packet to either a gateway node or a second group receiving powered backbone node that is assigned to the second group and that is closer to the gateway node. If the sending powered backbone node is assigned to the second group, then the sending powered backbone node sends a packet to either a gateway node or a first group receiving powered backbone node that is assigned to the first group and that is closer to the gateway node.

16 Claims, 12 Drawing Sheets

| | S0 | S1 | S2 | S3 | |
|---|---|---|---|---|---|
| Backbone Group A Category 1 | 1 | 3 | 1 | 4 | TX |
| | 3 | 1 | 4 | 1 | RX |
| Backbone Group A Category 2 | 2 | 4 | 2 | 3 | TX |
| | 4 | 2 | 3 | 2 | RX |
| Backbone Group B Category 3 | 1 | 3 | 2 | 3 | TX |
| | 3 | 1 | 3 | 2 | RX |
| Backbone Group B Category 4 | 2 | 4 | 1 | 4 | TX |
| | 4 | 2 | 4 | 1 | RX |
| Battery-Powered Group A Category 1,2 | 1,2 | | 2,1 | | TX |
| | 3,4 | | 3,4 | | RX |
| Battery-Powered Group B Category 3,4 | | 3,4 | | 4,3 | TX |
| | | 1,2 | | 1,2 | RX |
| Gateway | 1 | 3 | 2 | 4 | TX |
| | G | G | G | G | RX |

1200 Frame

FIG. 12

PROVIDING A LOW LATENCY BACKBONE IN A WIRELESS MESH NETWORK

BACKGROUND OF THE INVENTION

A wireless mesh network can have both battery-powered and powered nodes. Randomly connecting battery-powered and powered nodes can lead to poor performance of the mesh network especially for the battery-powered nodes. For example, a battery-powered node may have been assigned connections such that substantial traffic is routed through the node. In addition, randomly connecting battery-powered and powered nodes can lead to poor performance of the mesh network in terms of the latency time associated with moving a packet from any given node and a gateway node.

BRIEF DESCRIPTION OF THE DRAWINGS

Various embodiments of the invention are disclosed in the following detailed description and the accompanying drawings.

FIG. 12 is a block diagram illustrating an embodiment of a frame for a wireless mesh network with a low latency backbone.

DETAILED DESCRIPTION

Figure 1:
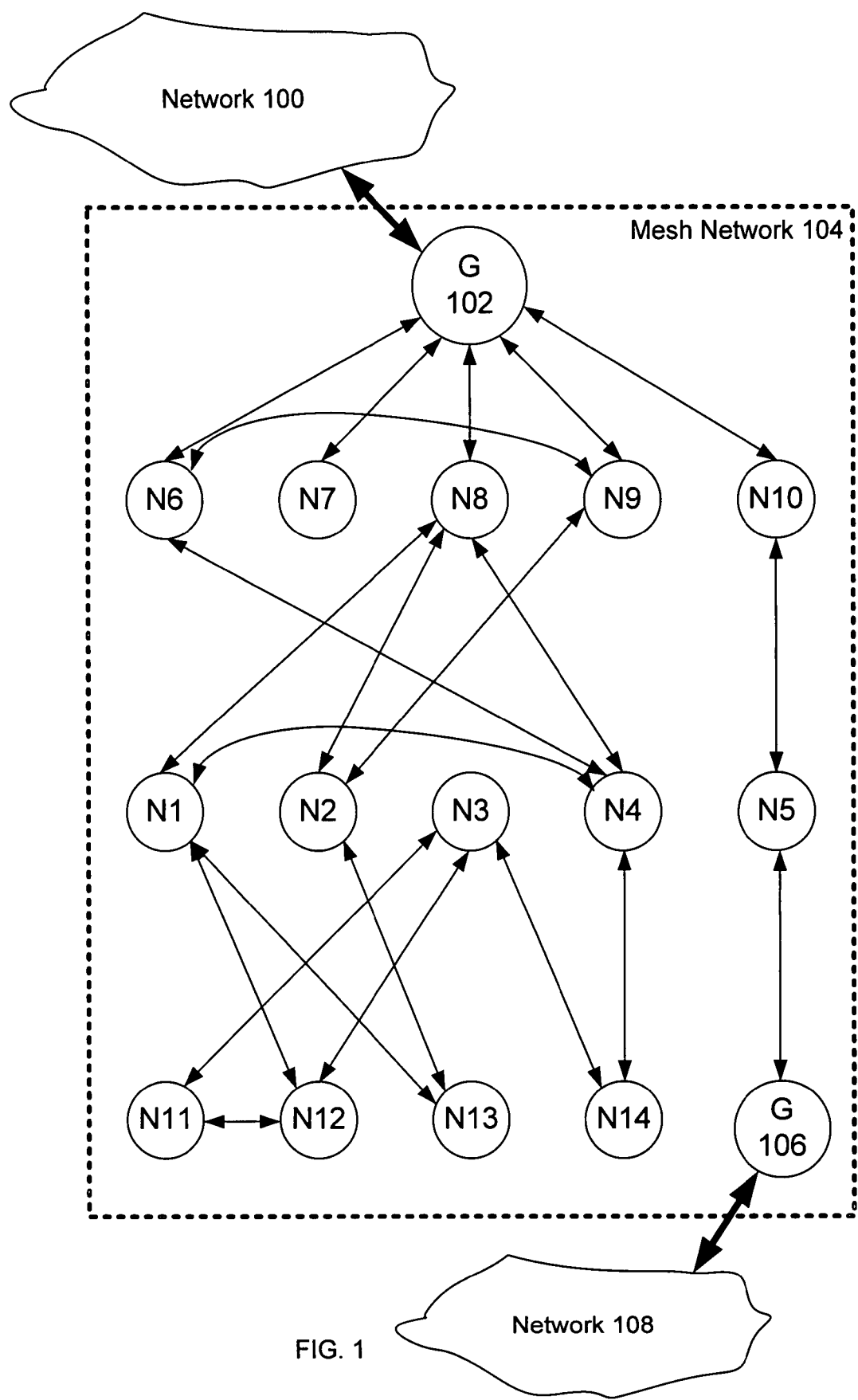
FIG. 1 is a block diagram illustrating an embodiment of a mesh network.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A low latency backbone in a wireless mesh network is disclosed. The mesh network includes a backbone of powered nodes with communication pathways that lead to a gateway or manager node. The mesh network includes battery-powered nodes so that a battery-powered node is within a single hop of at least one backbone node. The goal of the mesh network is to deliver a packet from a battery-powered node with a minimum latency while maintaining acceptably low power consumption at the battery-powered nodes. A frame is introduced to be as short as possible to achieve this goal. In addition, an assignment of nodes to two groups enables the short frame to be created by alternating transmission/reception between the two groups in the mesh network, particularly in the backbone.

A battery-powered node is assigned to communicate with a powered backbone node. A powered backbone node is assigned to either a first group or a second group. A first powered backbone node is assigned to a first group such that the first powered backbone node sends a packet to either a gateway node or a second powered backbone node that is assigned to the second group and that is one hop closer to the gateway node. The second powered backbone node is assigned to the second group such that the second powered backbone node sends a packet to either a gateway node or a third powered backbone node that is assigned to the first group and that is one hop closer to the gateway node.

A node's group assignment is selected such that the node's group assignment is of a different group from the group assigned to a parent of the node.

A battery-powered node's communication link can be assigned based at least in part on the signal strength received at a backbone node.

FIG. 1 is a block diagram illustrating an embodiment of a mesh network. In the example shown, mesh network 104 can communicate with network 100. Network 100 is a communication network and may be a local area network, a wide area network, the Internet, a wired network, a wireless network, or any other appropriate communication network. Mesh network 104 includes gateway nodes and mesh network nodes. Gateway nodes are represented in FIG. 1 as G 102 and G 106. The gateway node is able to communicate directly with a network—network 100 and network 108, respectively—and with mesh network nodes. For example, G 102 is able to directly communicate with N6, N7, N8, N9, and N10. The gateway node may also act as a mesh network coordinator sending to and receiving from the mesh network nodes information, configuration, status updates, etc. In some embodiments, there are multiple gateway nodes that can communicate with the same network (e.g., network 100) or one or more different networks. Mesh network nodes are represented in FIG. 1 as N1-N14. A mesh network node can communicate with other mesh network nodes and gateway nodes. In some embodiments, mesh network nodes are sensor or device mesh network nodes. For example, mesh network node N5 is able to communicate directly with mesh network node N10 and with gateway node G 106. In various embodiments, the connections allow communication only in one direction (i.e., to a node or from a node) or in both directions (i.e., both to and from a node).

In the example shown in FIG. 1, gateway and mesh network nodes communicate via radio transmitters and receivers using a packet. A packet may include a header section and a data section. The packet header may include information regarding packet type, time sent, source node, destination node, node health, number of tries for a hop, number of hops, etc. The packets are sent during defined time slots on defined frequencies using a time division multiple access (TDMA) methodology.

Figure 2:
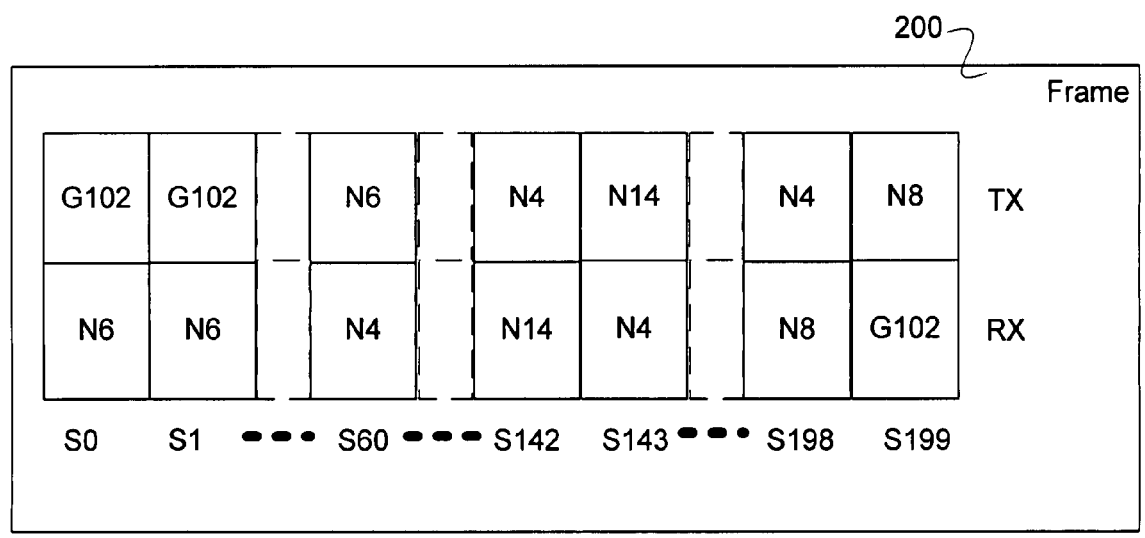
FIG. 2 is a block diagram illustrating an embodiment of a frame.

FIG. 2 is a block diagram illustrating an embodiment of a frame. In the example shown, frame 200 includes time slots that can be used to designate a receiver and transmitter. During the time slot a designated transmitter node transmits to a designated receiver node of a mesh network. In various embodiments, the frequency used for transmission and reception is fixed, is selected from a pool of frequencies, rotates in a fixed manner, is randomly assigned, or any other appropriate manner of assigning frequency to a transmission and reception. In some embodiments, the frequency comprises a frequency in the ISM band from 902.5 MHZ to 927.5 MHz. Frame 200 is repeated after executing the transmissions/receptions for all of its time slots. The network can support several different frames either running at different times or running concurrently. Some frames have only a few slots some have many slots depending on their design. Frame 200 contains 200 time slots (represented by S0, S1, S60, S142, S143, S198, and S199). Transmission links in the mesh network are assigned cells in a frame during which then can communicate. The transmissions and receptions for the frame are represented by designating a transmitter and a receiver for a given time slot. In S0 and S1, gateway G102 sends to node N6. In S60, node N6 sends to node N4. In S142, node N4 sends to node N14. In S143, node N14 sends to node N4. In S198, node N4 sends to node N8. In S199, node N8 sends to gateway G102. In some embodiments, the frame is developed by a gateway or managing node during setup or acquisition of nodes in the mesh network.

Figure 3:
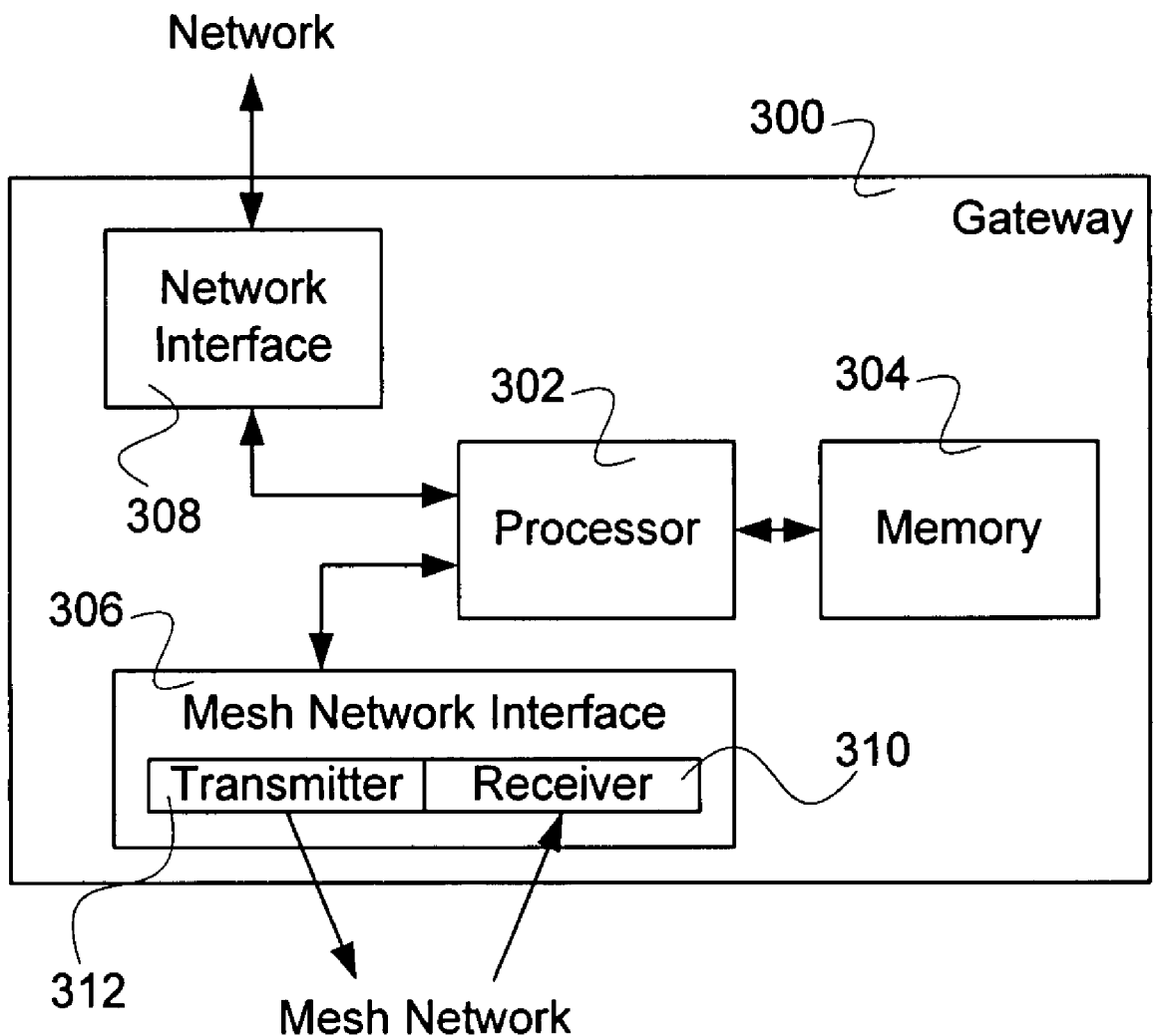
FIG. 3 is a block diagram illustrating an embodiment of a gateway of a mesh network.

FIG. 3 is a block diagram illustrating an embodiment of a gateway of a mesh network. In some embodiments, the gateway 300 of FIG. 3 is used to implement G 102 and/or G 106 in FIG. 1. In the example shown, gateway 300 includes processor 302, memory 304, mesh network interface 306, and network interface 308. Processor 302 runs software that when executed manages the mesh network. Management of the mesh network can include network setup, adding nodes, removing nodes, adding frames to the network, removing frames, monitoring status, optimizing network performance by reconfiguring frames, time synchronization, and/or any other appropriate network management function. Memory 304 provides storage for processor 302 including run-time storage and instruction storage. Mesh network interface 306 includes receiver 310 and transmitter 312. Receiver 310 receives communications in the form of packets transmitted from the mesh network. Transmitter 312 transmits communications in the form of packets to the mesh network. Network interface 308 communicates with a communication network comprising of one or more devices. Information from the mesh network is passed directly to or processed by gateway 300 using processor 302 before passing to the communication network. In some embodiments, gateway 300 is line powered so that power limitations due to finite battery reserves are not an issue. In various embodiments, network management is accomplished by a remote application or is coordinated by a node in the network.

Figure 4:
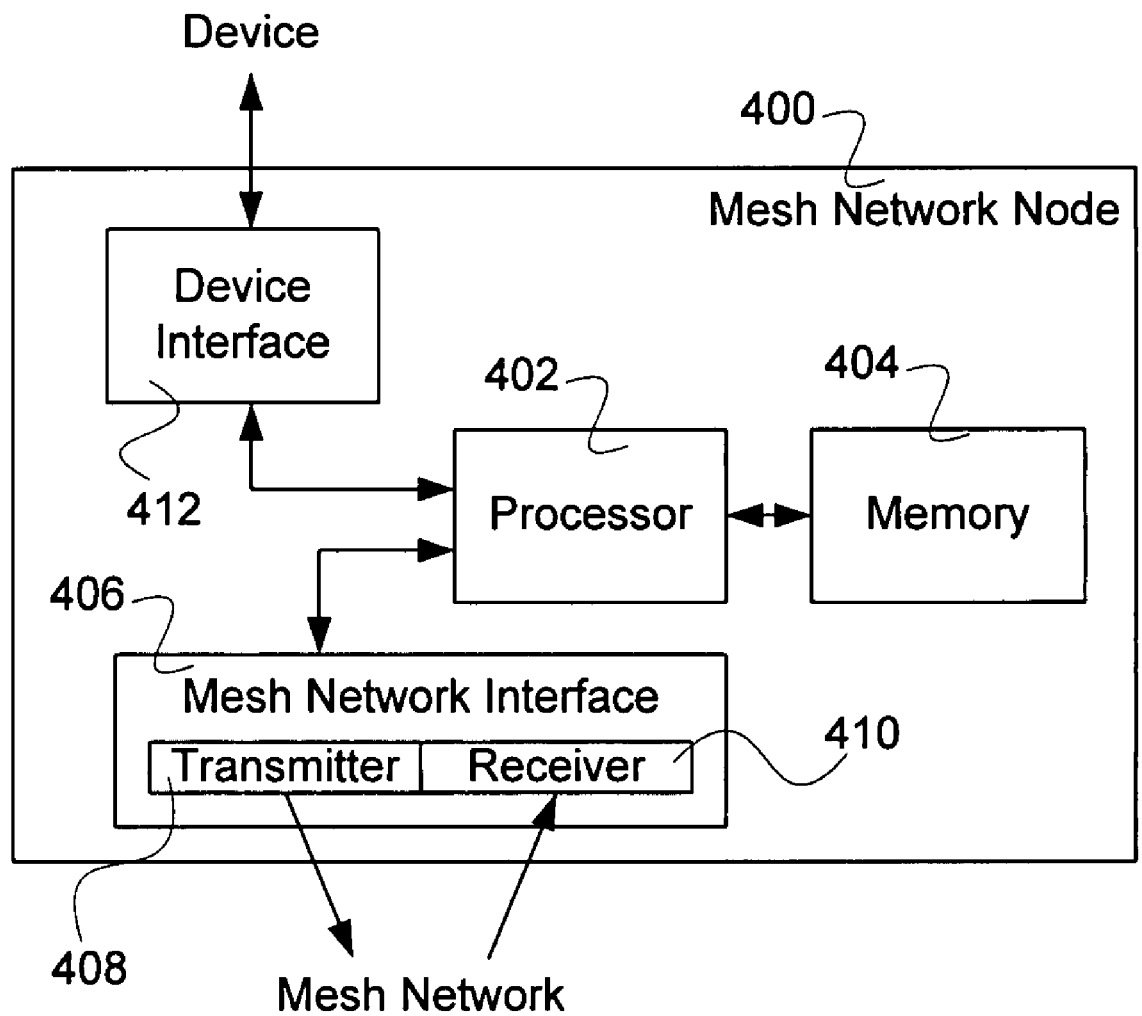
FIG. 4 is a block diagram illustrating an embodiment of a mesh network node of a mesh network.

FIG. 4 is a block diagram illustrating an embodiment of a mesh network node of a mesh network. In some embodiments, the mesh network node 400 of FIG. 4 is used to implement nodes N1-N14 in FIG. 1. In the example shown, mesh network node 400 includes processor 402, memory 404, mesh network interface 406, and device interface 412. Processor 402 runs software that when executed operates the mesh network node. Operation of the mesh network node can include setup, receiving messages, transmitting messages, adding capacity, removing capacity, providing status reports to a gateway manager such as gateway 300 in FIG. 3, time synchronization, and/or any other appropriate operating function. Memory 404 provides storage for processor 402 including run-time storage and instruction storage. Mesh network interface 406 includes receiver 410 and transmitter 408. Receiver 410 receives communications in the form of packets transmitted from the mesh network. Transmitter 408 transmits communications in the form of packets to the mesh network. In some embodiments, mesh network node 400 is usually battery powered so that power limitations due to finite battery reserves are an issue. Device interface 412 communicates with a device and/or sensor. Device and/or sensor types that can be connected to mesh network node include temperature sensors, strain sensors, image sensors, vibration sensors, fluid level sensors, chemical sensors, gas sensors, radiation detectors, position sensors, acceleration sensors, inclination sensors, shock sensors, infrared sensors, sound sensors, current sensors, voltage sensors, switching device, actuator device, or any other appropriate device and/or sensor. Information to/from the sensor and/or device is passed directly to or processed by sensor mesh network node 400 using processor 402 before passing from/to the mesh network.

Figure 5:
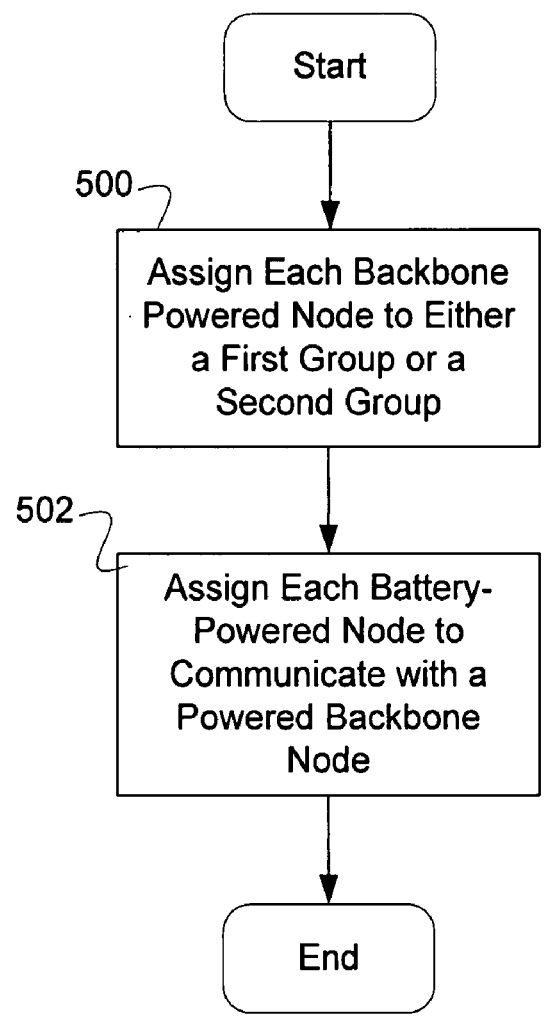
FIG. 5 is a flow diagram illustrating an embodiment of a process for providing a low latency backbone.

FIG. 5 is a flow diagram illustrating an embodiment of a process for providing a low latency backbone. In some embodiments, the process of FIG. 5 is executed on a gateway node such as gateway 300 of FIG. 3. In the example shown, in 500 each backbone powered node is assigned to either a first group or a second group. In 502, each battery-powered node is assigned to communicate with a powered backbone node. In some embodiments, each battery-powered node is assigned to either a first group or a second group based at least in part on the group/category of the powered backbone with which the battery-powered node communicates.

Figure 6:
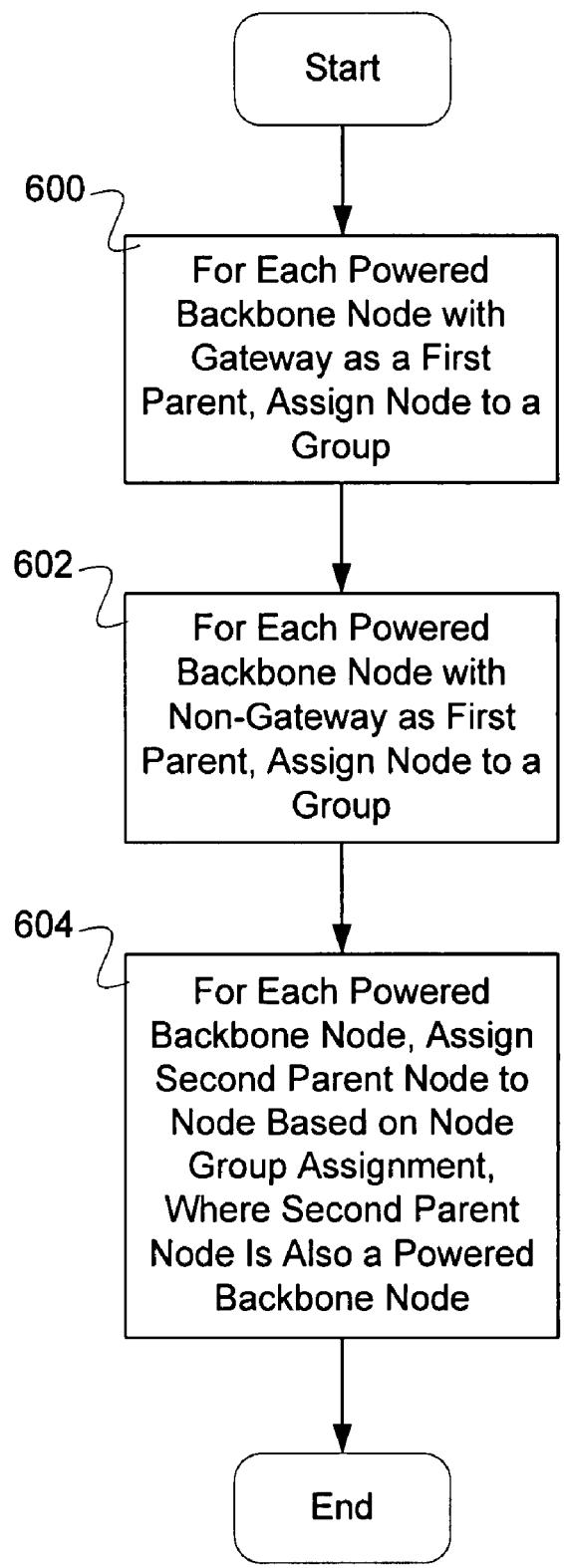
FIG. 6 is a flow diagram illustrating an embodiment of a process for assigning a powered backbone node to a first group or a second group.

FIG. 6 is a flow diagram illustrating an embodiment of a process for assigning a powered backbone node to a first group or a second group. In some embodiments, the process of FIG. 6 is used to implement 500 of FIG. 5. In the example shown, in 600 for each powered backbone node with a gateway as a first parent, the node is assigned to a group. In 602, for each powered backbone node with a non-gateway node as a first parent, the node is assigned to a group. In 604, for each powered backbone node, a second parent is assigned to a node based on the node's group assignment, where the second parent is also a powered backbone node. In some embodiments, a second parent node is not assigned, so path diversity is not provided to a node of the low latency backbone.

Figure 7:
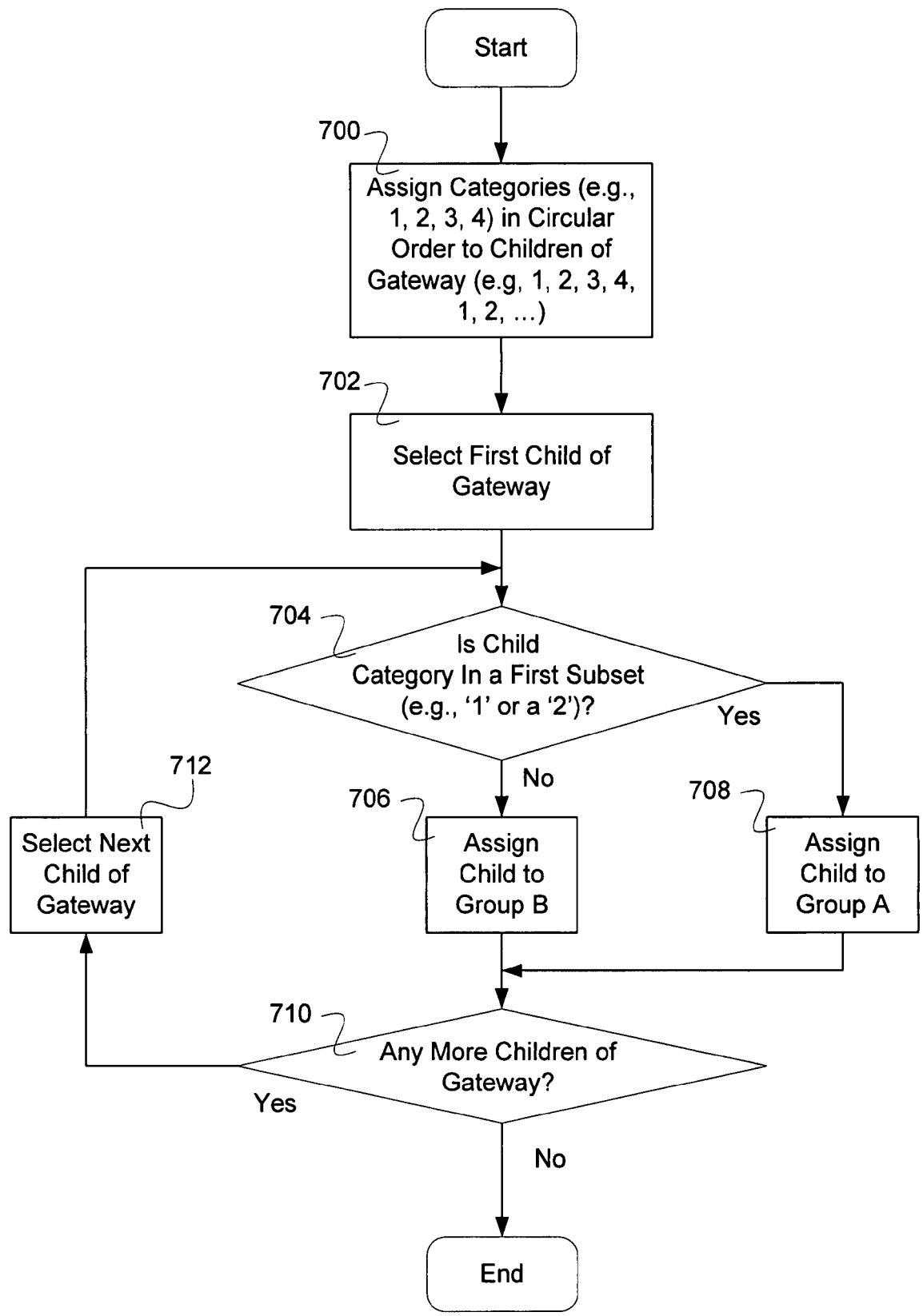
FIG. 7 is a flow diagram illustrating an embodiment of a process for assigning a group to a node with a gateway as a first parent.

FIG. 7 is a flow diagram illustrating an embodiment of a process for assigning a group to a node with a gateway as a first parent. In some embodiments, the process of FIG. 7 is used to implement 600 of FIG. 6. In the example shown, a category is assigned in a circular order to the children of a gateway. For example, four categories are used to provide labeling diversity and children nodes of a gateway are labeled 1, 2, 3, 4, 1, 2, etc. In 702, a first child of a gateway is selected. In 704, it is determined if a child category is in a first subset (e.g., a '1' or a '2'). If the child category is in the first subset, then in 708 the child is assigned to group A, and control passes to 710. For example, categories '1' and '2' are selected to be in a first subset and are assigned then to group A. In some embodiments, more categories are used and a larger subset is assigned to group A. In some embodiments, there are more than two groups and correspondingly more subsets of categories assigned to each of the groups. If the child category is not in the first subset, then in 706 the child is assigned to group B and control passes to 710. For example, categories '3' and '4' are selected to be in a second subset and are assigned to group B. In 710, it is determined if there are more children of the gateway. If there are more children of a gateway, a next child of a gateway is selected in 712, and control passes to 704. If there are not more children of a gateway, then the process ends. In some embodiments, there is a plurality of gateways.

Figure 8:
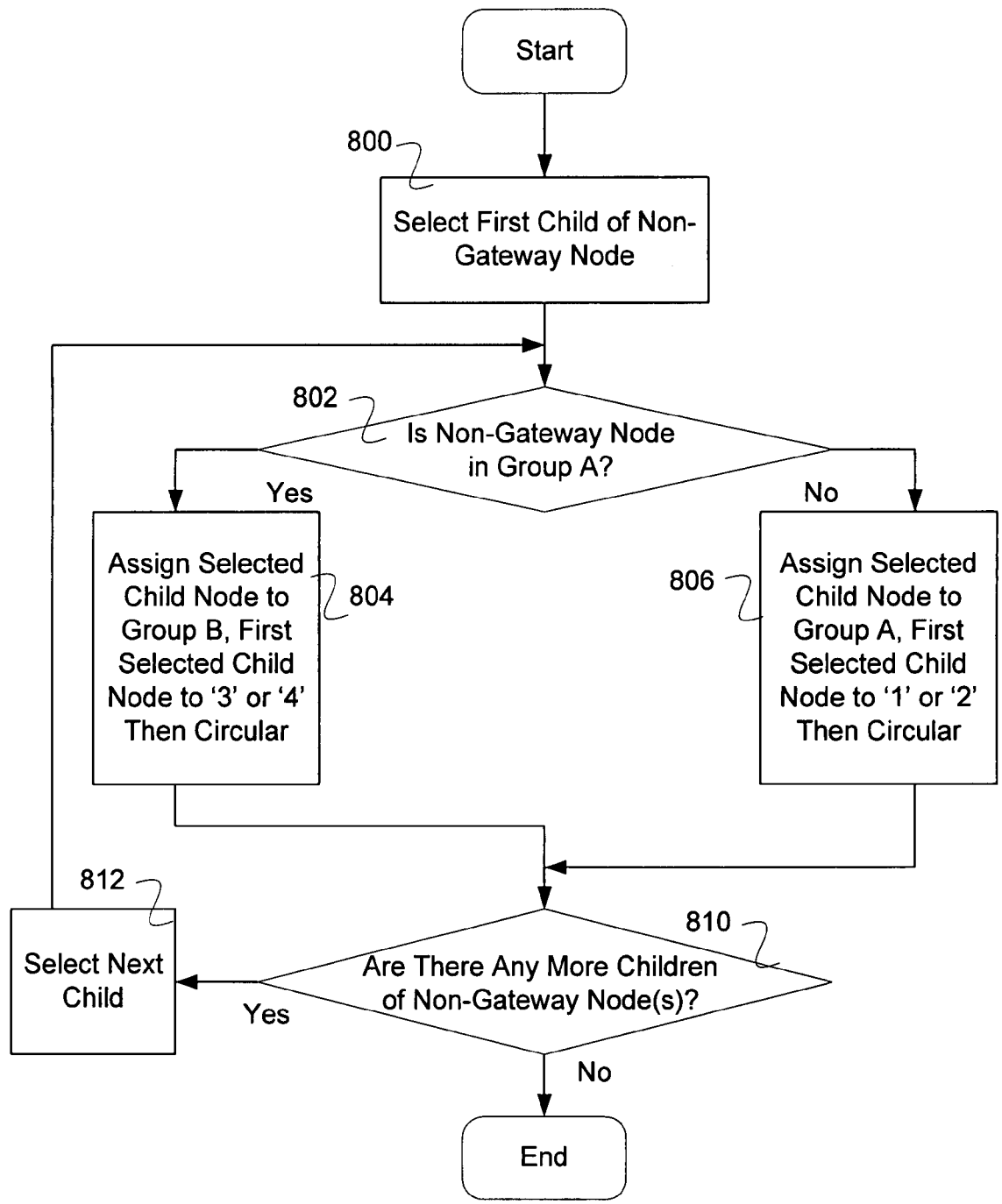
FIG. 8 is a flow diagram illustrating an embodiment of a process for assigning a group to a node with a non-gateway node as a first parent.

FIG. 8 is a flow diagram illustrating an embodiment of a process for assigning a group to a node with a non-gateway node as a first parent. In some embodiments, the process of FIG. 8 is used to implement 602 of FIG. 6. In the example shown, in 800 a first child of a non-gateway node is selected. In 802, it is determined if the non-gateway node is in Group A. If the non-gateway node is in group A, then in 804 assign selected child node to group B, where first child node is assigned category a '3' or a '4' and subsequent nodes assigned to the categories in group B circularly (e.g., if the first node is selected as '3' then the next is '4' and the next after that is '3', etc.), and control passes to 810. If the non-gateway node is not in group A, then in 806 assign selected child node to group A, where first child node is assigned category a '1' or a '2' and subsequent nodes assigned to the categories in group A circularly (e.g., if the first node is selected as '1' then the next is '2' and the next after that is '1', etc.), and control passes to 810. In 810, it is determined if there are any more children of non-gateway node(s). If there are more children, then in 812 a next child is selected and control passes to 802. If there are no more children, then the process ends.

Figure 9:
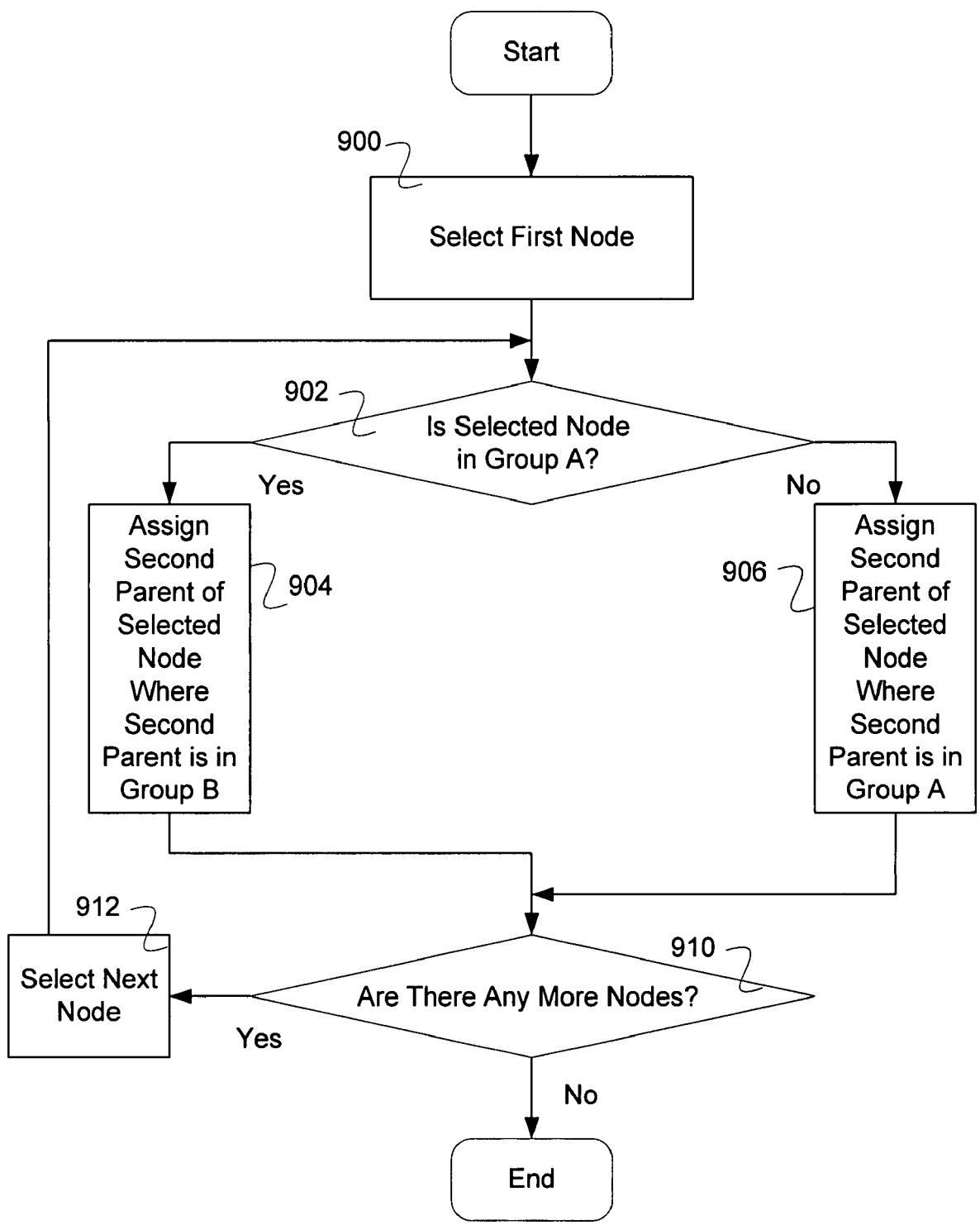
FIG. 9 is a flow diagram illustrating a process for assigning a second parent to a node.

FIG. 9 is a flow diagram illustrating a process for assigning a second parent to a node. In some embodiments, the process of FIG. 9 is used to implement 604 of FIG. 6. In the example shown, in 900 a first node is selected. In 902, it is determined if the selected node is in group A. If the selected node is in group A, then in 904 the second parent of the selected node is assigned where the second parent is in group B, and control passes to 910. Furthermore, in some embodiments, if the first parent is in category '3', the second parent must be chosen from those in category '4' and vice versa. If the selected node is not in group A, then in 906 the second parent of the selected node is assigned where the second parent is in group A, and control passes to 910. Furthermore, in some embodiments, if the first parent is in category '1', the second parent must be chosen from those in category '2' and vice versa. A second parent node comprises a backbone powered node. In some embodiments, the second parent is also selected based at least in part on the received signal strength from the selected node. For example, a node of group A or B, as appropriate, with the highest received strength from the selected node is selected as the second parent. In 910, it is determined if there are any more nodes (e.g., more nodes requiring assignment of second parents). If there are more nodes, then in 912, the next node is selected and control passes to 902. If there are no more nodes, then the process ends. In various embodiments, all nodes have a second parent selected, some nodes have a second parent selected, or no nodes have second parent selected.

Figure 10:
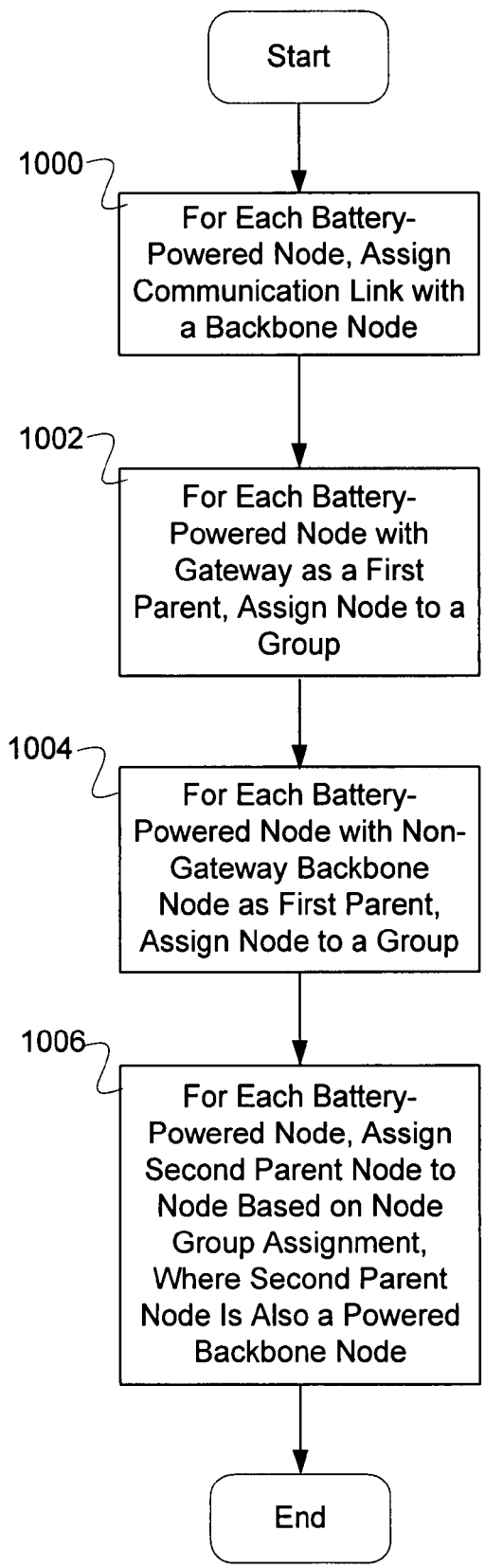
FIG. 10 is a flow diagram illustrating an embodiment of a process for assigning each battery-powered node to communicate with a powered backbone.

FIG. 10 is a flow diagram illustrating an embodiment of a process for assigning each battery-powered node to communicate with a powered backbone. In some embodiments, the process of FIG. 10 is used to implement 502 of FIG. 5. In the example shown, in 1000 for each battery-powered node, a communication link is assigned with a backbone node. In 1002, for each battery-powered node with gateway as a first parent, the node is assigned to a group. In 1004, for each battery-powered node with a non-gateway backbone node as a first parent, the node is assigned to a group. In 1006, for each battery-powered node, a second parent node is assigned to the node based on the node's group assignment, where the second parent node is powered backbone node.

Figure 11:
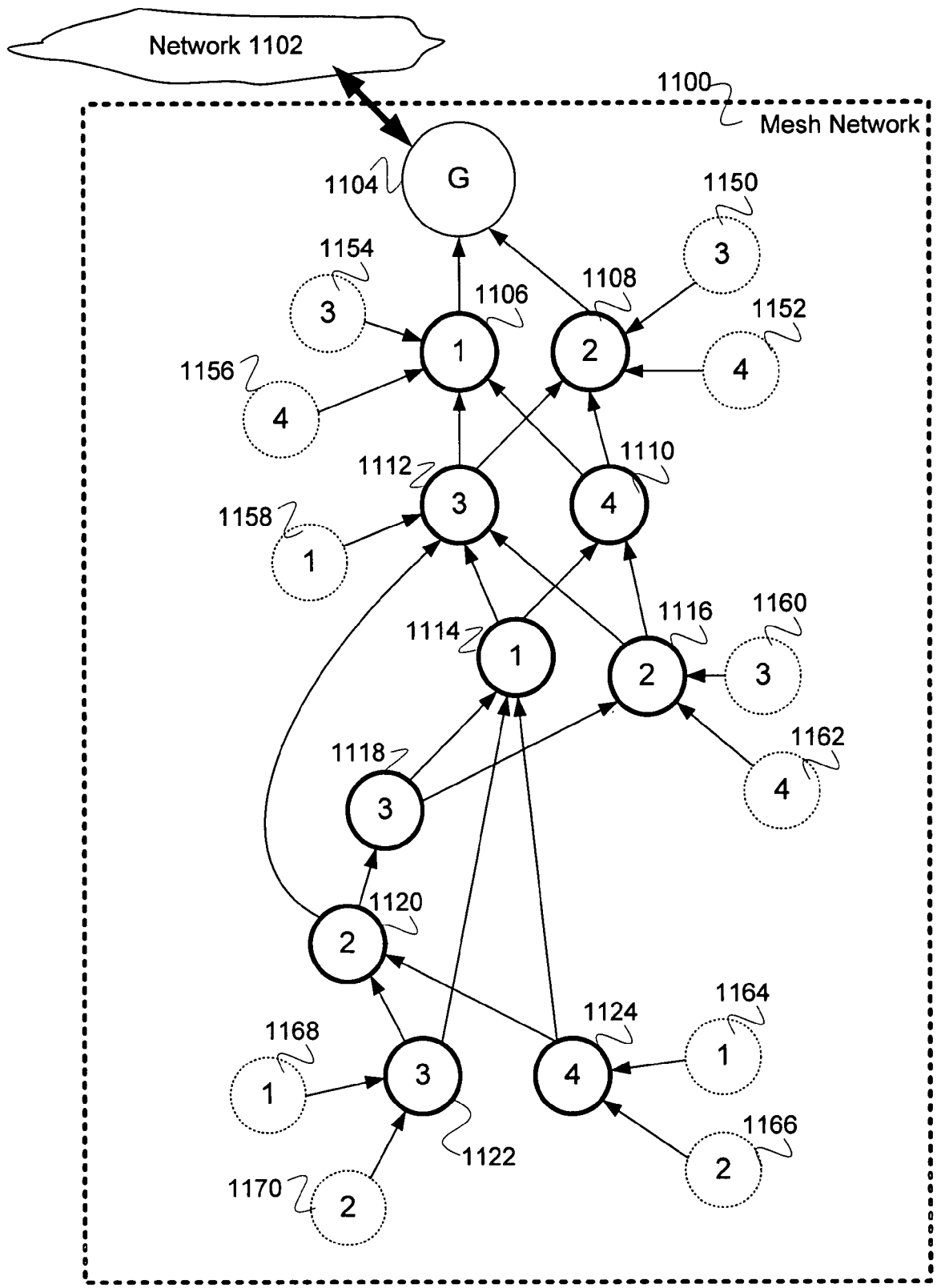
FIG. 11 is a block diagram illustrating an embodiment of a wireless mesh network with a low latency backbone.

FIG. 11 is a block diagram illustrating an embodiment of a wireless mesh network with a low latency backbone. In the example shown, mesh network 1100 includes gateway 1104 and nodes 1106-1124 and nodes 1150-1170. Gateway 1104 is able to communicate with network 1102. Gateway 1104 is also able to receive communications from node 1106 and node 1108. Node 1106 is able to receive communications from node 1110, node 1112, node 1154, and node 1156. Node 1108 is able to receive communications from node 1110, node 1112, node 1150, and node 1152. Node 1110 is able to receive communications from node 1114 and node 1116. Node 1112 is able to receive communications from node 1114, node 1116, node 1120, and node 1158. Node 1114 is able to receive communications from node 1118, node 1122, and node 1124. Node 1116 is able to receive communications from node 1118, node 1160, and node 1162. Node 1118 is able to receive communications from node 1120. Node 1120 is able to receive communications from node 1122 and 1124. Node 1122 is able to receive communications from node 1168 and node 1170. Node 1124 is able to receive communications from node 1164 and node 1166.

Gateway 1104, node 1106, node 1108, node 1110, node 1112, node 1114, node 1116, node 1118, node 1120, node 1122, and node 1124 are powered nodes so that power is provided in such a manner that power is not a limitation for node performance. In various embodiments, powered nodes are connected to a substantial power reserve, a power line connected to a power network, a generator, or any other appropriate power source. Node 1150, node 1152, node 1154, node 1156, node 1158, node 1160, node 1162, node 1164, node 1166, node 1168, and node 1170 are battery-powered node so that power is provided in such a manner that power is a limitation for node performance. In some embodiments, battery-powered nodes include a battery that has a finite power providing capability and, given a desired lifetime for the node without maintenance for recharging or replacing the battery, a limited ability of the node to draw power from the battery in order to meet the desired lifetime.

For each of the powered nodes with gateway 1104 as a parent node, a category is assigned and then a group is assigned; node 1106 is assigned to a category of 1 and node 1108 is assigned to a category of 2. For a node assigned to either a category of 1 or a category of 2, the node is assigned to group A. For a node assigned to either a category of 3 or a category of 4, the node is assigned to group B. So, both node 1106 and node 1108 are assigned to group A.

For each powered backbone node with a non-gateway node as a first parent, a category is assigned based on the parent node category/group and then a group is assigned. For example, node 1112 has node 1106 as a first parent. Node 1106 is assigned to a category of 1 and is assigned to group A. Node 1112 is therefore assigned either to a category of 3 or a category of 4; in this case a category of 3 is assigned. Node 1110 has node 1106 also as a first parent. Node 1110 is therefore assigned to a category of 4 (circular after a category of 3 was assigned to the first node, node 1112).

Node 1114 has node 1112 as a first parent. Node 1112 is assigned to a category of 3 and is assigned to group B. Node 1114 is therefore assigned either to a category of 1 or a category of 2; in this case a category of 1 is assigned. Node 1116 has node 1112 also as a first parent. Node 1116 is therefore assigned to a category of 2 (circular after a category of 1 was assigned to the first node, node 1114).

Node 1118 has node 1114 as a first parent. Node 1114 is assigned to a category of 1 and is assigned to group A. Node 1118 is therefore assigned either to a category of 3 or a category of 4; in this case a category of 3 is assigned.

Node 1120 has node 1118 as a first parent. Node 1118 is assigned to a category of 3 and is assigned to group B. Node 1120 is therefore assigned either to a category of 1 or a category of 2; in this case a category 2 is assigned.

Node 1122 has node 1120 as a first parent. Node 1120 is assigned to a category of 2 and is assigned to group A. Node 1122 is therefore assigned either to a category of 3 or a category of 4; in this case a category of 3 is assigned. Node 1124 has node 1120 also as a first parent. Node 1124 is therefore assigned to a category of 4 (circular after a category of 3 was assigned to the first node, node 1122).

A second parent is assigned to each backbone powered node. Each second parent is also a backbone powered node and is based at least in part on the category/group of each backbone powered node. For example, node 1112 of FIG. 11 has a category of 3 and a first parent node 1106; a second parent node is selected from group A: node 1108 with a category of 2. Node 1110 has a category of 4 and a first parent node 1106; a second parent node is selected from group A: node 1108 with a category of 2.

Node 1114 of FIG. 11 has a category of 1 and a first parent node 1112; a second parent node is selected from group B: node 1110 with a category of 4. Node 1116 has a category of 2 and a first parent node 1112; a second parent node is selected from group B: node 1110 with a category of 4.

Node 1118 of FIG. 11 has a category of 3 and a first parent node 1114; a second parent node is selected from group A: node 1116 with a category of 2.

Node 1120 of FIG. 11 has a category of 2 and a first parent node 1118; a second parent node is selected from group B: node 1112 with a category of 3.

Node 1122 of FIG. 11 has a category of 3 and a first parent node 1120; a second parent node is selected from group A: node 1114 with a category of 1. Node 1124 has a category of 4 and a first parent node 1120; a second parent node is selected from group A: node 1114 with a category of 1.

For battery-powered nodes, assign a communication link with a backbone powered node or gateway. For example, node 1154 and node 1156 are assigned to communicate with node 1106. Node 1150 and node 1152 are assigned to communicate with node 1108. Node 1158 is assigned to communicate with 1112. Node 1160 and node 1162 are assigned to communicate with node 1116. Node 1168 and node 1170 are assigned to communicate with node 1122. Node 1164 and node 1166 are assigned to node 1124. A battery-powered node is assigned to communicate with backbone powered nodes that are within signal range of the node. In some embodiments, the backbone powered node with the strongest received signal strength from a battery-powered node is selected as the node to communicate with. In some embodiments, a backbone powered node is close enough that a battery-powered node is able to reduce transmission power, thus increasing its lifetime. In some embodiments, the number of connections to backbone powered node is too large so that an alternate backbone node is selected.

For each battery-powered node with a gateway as first parent, a group is assigned. In the example shown in FIG. 11, there are no such nodes. So, each battery-powered node with a non-gateway node as first parent is assigned a group. For example, node 1154 and node 1156 have node 1106 as a first parent, and are assigned to a category of 3 and a category of 4, respectively, and to group B. Node 1150 and node 1152 have node 1108 as a first parent, and are assigned to a category of 3 and a category of 4, respectively, and to group B. Node 1158 has node 1112 as a first parent and is assigned to a category of 1 and to group A. Node 1160 and node 1162 have node 1116 as a first parent, and are assigned to a category of 3 and a category of 4, respectively, and to group B. Node 1168 and node 1170 have node 1122 as a first parent, and are assigned to a category of 1 and a category of 2, respectively, and to group A. Node 1164 and node 1166 have node 1124 as a first parent, and are assigned to a category of 1 and a category of 2, respectively, and to group A.

In some embodiments, some or all of battery-powered nodes are assigned a second parent based on their category/group assignment and the second parent node is a powered backbone node.

FIG. 12 is a block diagram illustrating an embodiment of a frame for a wireless mesh network with a low latency backbone. In the example shown, frame 1200 includes a 4 slot frame with slots S0, S1, S2, and S3. Frame 1200 is for transmitting packets to a gateway. Frame 1200 corresponds to mesh network 1100 of FIG. 11. For powered backbone nodes of group A in a category of 1, in slot S0 the node transmits to a node of group B in a category of 3, if appropriate (there may not be a node linked of this type for every node of group A in a category of 1); in slot S1 the node receives from a node of group B in a category of 3, if appropriate; in slot S2, the node transmits to a node of group B in a category of 4, if appropriate; and in slot S3, the node receives from a node of group B in a category of 4.

For powered backbone nodes of group A in a category of 2, in slot S0 the node transmits to a node of group B in a category of 4, if appropriate (there may not be a node linked of this type for every node of group A in a category of 2); in slot S1 the node receives from a node of group B in a category of 4, if appropriate; in slot S2, the node transmits to a node of group B in a category of 3, if appropriate; and in slot S3, the node receives from a node of group B in a category of 3.

For powered backbone nodes of group B in a category of 3, in slot S0 the node receives from a node of group A in a category of 1, if appropriate (there may not be a node linked of this type for every node of group B in a category of 3); in slot S1 the node transmits to a node of group A in a category of 1, if appropriate; in slot S2, the node receives from a node of group A in a category of 2, if appropriate; and in slot S3, the node transmits to a node of group A in a category of 2.

For powered backbone nodes of group B in a category of 4, in slot S0 the node receives from a node of group A in a category of 2, if appropriate (there may not be a node linked of this type for every node of group B in a category of 4); in slot S1 the node transmits to a node of group A in a category of 2, if appropriate; in slot S2, the node receives from a node of group A in a category of 1, if appropriate; and in slot S3, the node transmits to a node of group A in a category of 1.

For battery-powered nodes of group A in a category of 1 or 2, in slot S0 a node of category 1 transmits to a backbone powered node of 3, and a node of category 2 transmits to a backbone powered node of 4. In slot S2, a node of category 2 transmits to a backbone powered node of 3, and a node of category 1 transmits to a backbone powered node of 4.

For battery-powered nodes of group B in a category of 3 or 4, in slot S1 a node of category 3 transmits to a backbone powered node of 1, and a node of category 4 transmits to a backbone powered node of 2. In slot S3, a node of category 4 transmits to a backbone powered node of 1, and a node of category 3 transmits to a backbone powered node of 2.

For nodes transmitting to a gateway, in slot S0 a node of a category of 1 transmit to the gateway; in slot S1 a node of a category of 2 transmit to the gateway; in slot S2 a node of a category of 3 transmits to the gateway; and in slot S3 a node of a category of 4 transmits to the gateway.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of communicating for a mesh network comprising:
   assigning a battery-powered node to communicate with a sending powered backbone node;
   assigning the sending powered backbone node to either a first group or a second group,
      wherein in the event that the sending powered backbone node is assigned to the first group, the sending powered backbone node sends a packet to a first node that is assigned to the second group and that is closer to a gateway node, wherein the first node then sends the packet to a second node that is assigned to the first group and that is closer to the gateway node than the first node; and
   wherein in the event that the sending powered backbone node is assigned to the second group, then the sending powered backbone node sends a packet to a third node that is assigned to the first group and that is closer to a gateway node, wherein the third node then sends the packet to a fourth node that is assigned to the first group and that is closer to the gateway node than the third node.

2. A method as in claim 1, wherein assigning the battery-powered node to communicate with the powered backbone node is based at least in part on a received signal strength at the powered backbone node from the battery-powered node.

3. A method as in claim 1, further including assigning the battery-powered node to either the first group or the second group.

4. A method as in claim 3, wherein assigning the battery-powered node to either the first group or the second group includes assigning the battery-powered node to a category.

5. A method as in claim 1, wherein assigning the powered backbone node to either the first group or the second group includes assigning the powered backbone node to a category.

6. A non-transitory computer readable medium embodying a computer program product for communicating for a mesh network, comprising computer instructions for:
   assigning a battery-powered node to communicate with a sending powered backbone node;
   assigning the sending powered backbone node to either a first group or a second group,
      wherein in the event that the sending powered backbone node is assigned to the first group, the sending powered backbone node sends a packet to a first node that is assigned to the second group and that is closer to a gateway node, wherein the first node then sends the packet to a second node that is assigned to the first group and that is closer to the gateway node than the first node; and
   wherein in the event that the sending powered backbone node is assigned to the second group, then the sending powered backbone node sends a packet to a third node that is assigned to the first group and that is closer to a gateway node, wherein the third node then sends the packet to a fourth node that is assigned to the first group and that is closer to the gateway node than the third node.

7. A system for communicating for a mesh network comprising:
   a processor; and
   a memory coupled with the processor, wherein the memory is configured to provide the processor with instructions which when executed cause the processor to:
   assign a battery-powered node to communicate with a powered backbone node;
   assign the powered backbone node to either a first group or a second group,
      wherein in the event that the sending powered backbone node is assigned to the first group, then the sending powered backbone node sends a packet to a a first node that is assigned to the second group and that is closer to a gateway node, wherein the first node then sends the packet to a second node that is assigned to the first group and that is closer to the gateway node than the first node; and
   wherein in the event that the sending powered backbone node is assigned to the second group, then the sending powered backbone node sends a packet to a third node that is assigned to the first group and that is closer to a gateway node, wherein the third node then sends the packet to a fourth node that is assigned to the first group and that is closer to the gateway node than the third node.

8. A backbone system of powered nodes in a mesh network comprising:
   a gateway node;
   a battery-powered node;
   a plurality of powered backbone nodes configured such that:
   1) the battery-powered node can send a packet to one of the plurality of backbone powered nodes;
   2) each powered node of the plurality of powered backbone nodes belongs to either a first group or a second group;
   3) a powered node of the plurality of powered backbone nodes in the first group sends a received packet to a first powered node of the plurality of powered backbone nodes in the second group that is closer to the gateway node and then the first powered node sends the packet to a second powered node of the plurality of powered backbone nodes in the first group and that is closer to the gateway node than the first node; and
   4) a powered node of the plurality of powered backbone nodes in the second group sends a received packet to a third powered node of the plurality of powered backbone nodes in the first group that is closer to the gateway node and then the third powered node sends the packet to a fourth powered node of the plurality of powered backbone nodes in the second group and that is closer to the gateway node than the third node.

9. A system as in claim 7, wherein assigning the battery-powered node to communicate with the powered backbone node is based at least in part on a received signal strength at the powered backbone node from the battery-powered node.

10. A system as in claim 7, further including assigning the battery-powered node to either the first group or the second group.

11. A system as in claim 10, wherein assigning the battery-powered node to either the first group or the second group includes assigning the battery-powered node to a category.

12. A system as in claim 7, wherein assigning the powered backbone node to either the first group or the second group includes assigning the powered backbone node to a category.

13. A backbone system as in claim 8, wherein assigning the battery-powered node to communicate with the powered backbone node is based at least in part on a received signal strength at the powered backbone node from the battery-powered node.

14. A backbone system as in claim 8, further including assigning the battery-powered node to either the first group or the second group.

15. A backbone system as in claim 14, wherein assigning the battery-powered node to either the first group or the second group includes assigning the battery-powered node to a category.

16. A backbone system as in claim 8, wherein assigning the powered backbone node to either the first group or the second group includes assigning the powered backbone node to a category.

\* \* \* \* \*